3,129,207
PROCESS FOR THE POLYMERIZATION
OF VINYL FLUORIDE
Virgil Eugene James, Buffalo, N.Y., assignor to E. I. du Pont de Nemours and Company, Wilmington, Del., a corporation of Delaware
No Drawing. Filed Mar. 2, 1961, Ser. No. 92,763
10 Claims. (Cl. 260—92.1)

This invention relates to the preparation of polymeric materials and, more particularly, to the polymerization of vinyl fluoride and the like. Its main object is to effect economies in the production of vinyl fluoride polymers without detracting from the quality of the polymeric product. Other objects will be apparent from reading the following disclosure.

A particularly attractive process for polymerizing vinyl fluoride to form polyvinyl fluoride and the like involves charging a suitable reaction vessel equipped with agitating means with water and a water-soluble catalyst, e.g. 2,2'-diguanyl-2,2'-azopropane dihydrochloride along with a stream of vinyl fluoride, the amount of water employed ranging from 0.1 to 20, preferably from 3 to 20 times the weight of vinyl fluoride monomer. The vessel is maintained at a superatmospheric pressure of 25–1,000, preferably 150–1,000 atmospheres, and a temperature of 25°–250° C., preferably 50°–250° C., the combination of conditions and concentration of the charge being arranged to provide polymerization of the vinyl fluoride. A slurry of particulate polyvinyl fluoride in water is removed from the reactor at a rate sufficient to maintain conditions within the reactor conducive to polymerization. After isolating the resulting polyvinyl fluoride from the slurry by filtration, centrifuging or the like, the polyvinyl fluoride in the form of a powder or cake may be washed with water or an organic solvent and dried. A process falling within the above description is described in U.S. application Serial No. 856,573, filed December 1, 1959, and assigned to the assignee of the present application.

The vinyl fluoride monomer may be prepared by the hydrofluorination of acetylene according to the process described in U.S. Patent 2,118,901. The monomer may also be prepared by the dehydrofluorination of 1,1-difluoroethane using any of the processes described in U.S. Patents 2,480,560, 2,599,631 and 2,674,632.

The water-soluble catalysts useful in the above described process include those free radical generating catalysts in the following list: water-soluble salts of inorganic per acids, e.g. ammonium persulfate, potassium persulfate, potassium perphosphate, potassium percarbonate; organic peroxides which contain hydrophyllic groupings of sufficient effect to render them water soluble, e.g. beta,beta'-biscarboxypropionyl peroxide, t-butyl hydrogen peroxide; alkali metal salts of carboxylic azonitriles of the types described in U.S. Patent 2,520,338, e.g. alpha,alpha'-azobis(alpha-methyl-gamma-carboxybutyronitrile), alpha, alpha' - azobis(alpha,gamma, gamma - trimethyl-gamma-carboxybutyronitrile), alpha,alpha' - azobis(alpha - methyl - gamma - phenyl - gamma - carboxybutyronitrile), alpha,alpha' - azobis(alpha - propyl - gamma - carboxybutyronitrile), alpha,alpha'-azobis(alpha,gamma-dimethyl gamma-carboxyvaleronitrile); and inorganic acid salts of azoamidines of the types described in U.S. Patent 2,599,299, e.g. the dihydrochlorides of 2,2'-diguanyl-2,2'-azopropane, 2,2' - diguanyl - 2,2' - azobutane, 2,2' - bis-(N-phenylguanyl) - 2,2' - azopropane, 2,2' - bis(N,N-diethylguanyl)-2,2'-azopropane and 2,2'-bis(N-hydroxyethylguanyl)-2,2'-azopropane.

One of the primary contributions to the expense of this polymerization process is made by the expensive catalyst, sometimes called the reaction initiator. Although amounts ranging from less than 0.001% to 2%, based on the weight of vinyl fluoride may be used, even the lowest percentage constitutes a substantial quantity of material in any moderate size polyvinyl fluoride operation.

Attempts to recover the catalyst for re-use from the process waste have been unsuccessful. As mentioned previously, the catalyst functions in the polymerization process as a free radical generator. As is known to those skilled in the art, the free radicals produced by the catalyst operate by combining with molecules of the polymerizable monomer to form new free radicals which, in turn, combine with more monomer molecules to form still other free radicals, etc. In this manner, long polymeric chains are propagated. Polymeric chain growth terminates when the free radical-bearing polymer fragment encounters another free radical. In any case, this type of polymerization tends to use up the catalyst, leaving substantially little to be recovered.

Surprisingly, however, applicant's invention constitutes re-using in the polymerization process at least a portion of the waste water. Despite the fact that this water, hereinafter called "recycle water," contains substantially no catalyst, its use permits a reduction of from about 10% to 25% or more in the amount of new catalyst necessary to obtain the same polyvinyl fluoride product. Additional savings are obtained if, in addition to recycling the waste water, the water is treated to increasee its specific resistance to at least 50,000 ohm-centimeters, preferably to at least 200,000 ohm-centimeters, and to reduce its oxygen content to less than 50 parts per million. Although recycling of the waste water in any amount will reduce the amount of additional catalyst that is necessary under any particular set of conditions, the necessity to obtain polymerization of using some catalyst in the recycle water, either by addition of solid catalyst or catalyst dissolved in water, cannot be eliminated.

Although this invention will be specifically illustrated for the preparation of polyvinyl fluoride in a continuous manner, its application is not so limited. The invention, when applied to a batch process, will also result in decreasing the amount of catalyst necessary for producing a useful product. The invention is useful in the polymerization of vinyl fluoride alone or in combination with any polymerizable organic compound having at least one ethylenic double bond. Examples of additional ethylenic compounds which can be copolymerized with vinyl fluoride by this process, wherein the vinyl fluoride is present in substantial or in major amount, are monoethylenic hydrocarbons, e.g. ethylene, propylene, isobutylene and styrene; halogen-substituted ethylenes, e.g. vinyl chloride, vinyl bromide, 1,1-dichloroethylene, 1,1-difluoroethylene, difluorochloroethylene, trifluorochloroethylene and tetrafluoroethylene; vinyl esters, e.g. vinyl formate, vinyl acetate, vinyl benzoate and vinyl esters of inorganic acids; vinyl ethers, e.g. vinyl ethyl ether and vinyl dioxolane; vinyl ketones, e.g. methyl vinyl ketone; N-vinyl imides, e.g. N-vinyl succinimide and N-vinyl phthalimide; acrylic and methacrylic acids and their derivatives, e.g. esters, nitriles, amides, anhydrides, and acid halides, including methyl methacrylate, allyl methacrylate, N-butyl methacrylamide, etc., derivatives of maleic and fumaric acid, e.g. diethyl maleate and dimethyl fumarate.

The resulting vinyl fluoride polymeric products will be useful in the form of films, foils, sheets, ribbons, bands, rods, tubing and molded objects. They will also be useful as coatings for fabrics, leather, cellulosic materials such as paper, etc. It will also be possible to combine these vinyl fluoride polymers with plasticizers, modifiers, stabilizers, softeners, dyes, pigments, fillers, etc.

The invention will be more clearly understood by referring to the examples which follow. These examples, although illustrating specific embodiments of the invention, should not be considered limitative in any way.

*Examples 1–2*

In Example 1, a stream of filtered, deionized, deoxygenated process water, water that had not previously been used in the polymerization, along with an equal amount of recycle water that was also filtered, deionized and deoxygenated were continuously fed into a stainless steel reactor, each at a rate of 240 pounds/hour to provide a total feed water rate of 480 pounds/hour. Specifically, the water were passed through a full-flow in-line filter and a deionizer column, and then was deoxygenated by sparging with nitrogen before being fed to the reactor. The dihydrochloride of 2,2'-diguanyl-2,2'-azopropane, had been added to the process water to provide a concentration of 103 parts of the catalyst per million parts of the total feed water. The specific resistance of the water was 1,000,000 ohm-cm. Simultaneously, vinyl fluoride at a rate of 48 pounds/hour was fed to the reactor. The temperature of the reactor was maintained at 97° C. and the pressure in the reactor was maintained at 4,000 p.s.i. by automatically controlling the rate at which the product was withdrawn.

The contents of the reactor were agitated continuously to provide intimate mixture of the feed streams throughout the interior of the reactor. The product slurry composed of finely particulate polyvinyl fluoride and water was removed at a rate to provide 23 pounds of polymer/hr./cu. ft. of reactor volume. The polymer was separated from the water by filtration and recovered as a substantially dry powder. The water recovered from the filtration step was the recycle water, which was joined with additional process water to provide the feed water.

The Melt-Flow Number, which is an indication of molecular weight, was determined for the resulting polyvinyl fluoride. The Melt-Flow Number is the square of the average diameter in inches of a roughly circular film disc resulting from the pressing between two polished chromium-plated steel plates of a 1-inch diameter wafer consisting of 1.00±0.01 gram of said polymer in dried, particulate, compressed form for 5 minutes at 260±1° C. under a total load of 12,250 pounds. It is determined according to the following procedure: A quantity of particulate polymer (1.00±0.01 gram), dried to less than 0.2% water by weight, is transferred to the 1-inch diameter die of a Buehler Metallurgical Mounting Press, the plug inserted and the die pressed for a few moments at a load of about 5,000 pounds. After releasing the load, removing and disassembling the die, the resulting polymer wafer is an inch in diameter and about 100 mils thick. The polymer wafer is centered between two polished chromium-plated steel plates, 0.020 inch thick and cut to 5 inches by 8 inches with corners and edges smooth. This assembly is then centered between the platens of a Carver Laboratory Press, the temperature of the surface of the center of each platen being maintained at 260±1° C. The Carver Press has 5-inch by 5-inch electrically heated platens and is rated for a load of up to 10 tons. The polymer wafer is then pressed for 5 minutes at this temperature under a load of 12,250 pounds as indicated by the load guage pointer. As the polymer mass melts and increases in diameter, it is necessary to pump up the press periodically to hold the load constant. At the end of the 5-minute pressing period, the load is immediately released and the plate-polymer-plate assembly is removed from the press and immersed quickly in cool water. After allowing the assembly to remain for several minutes under water, the plates are separated and the film disc removed, dried by blotting and its diameter measured to the nearest 0.01 inch. If the film disc is irregular, eight diameters are measured and averaged arithmetically. The square of this average diameter is the Melt-Flow Number of the polymer. The Melt-Flow Number for the polyvinyl fluoride of Example 1 was 7.3.

In Example 2, the process described in Example 1 was repeated except that the recycle water rate was reduced to 144 pounds/hour and the process water rate was increased to 336 pounds/hour so that the total feed water rate remained at 480 pounds/hour. To obtain the identical polyvinyl fluoride product (Melt-Flow No. of 7.3) at the same production rate of 23 pounds/hour/cu. ft. of reactor volume without changing any other conditions, it was necessary to use a catalyst concentration of 112 parts per million parts of total feed water.

In control A, the process of Example 1 was repeated but without using any recycle water. Instead, 480 pounds/hour of process water was used as the feed water. To obtain the identical polyvinyl fluoride product (Melt-Flow No. of 7.3) at the same production rate of 23 pounds/hour/cu. ft. of reactor volume without changing any other conditions, it was necessary to use a catalyst concentration of 129 parts per million of feed water, an increase of 25.3% over the catalyst used in Example 1 and 15.2% over the catalyst used in Example 2.

In control B, the process of Example 1 was repeated but without using any process water. Instead, 480 pounds/hour of recycle water was used as the feed water. No catalyst was added to the recycle water and no polymer was produced.

*Example 3*

Example 1 was repeated, i.e. using 50% recycle water and 50% process water as the feed water to the reactor, except for the use of potassium persulfate as the catalyst. A reduction in the amount of catalyst necessary to produce a polyvinyl fluoride product identical in quantity and quality to that produced without using recycle water was observed.

*Example 4*

Example 1 was repeated, i.e. using 50% recycle water and 50% process water as the feed water to the reactor, except for the use of beta,beta',-biscarboxy-propionyl peroxide as the catalyst. A reduction in the amount of catalyst necessary to produce a polyvinyl fluoride product identical in quantity and quality to that produced using recycle water was observed.

*Example 5*

Example 1 was repeated, i.e. using 50% recycle water and 50% process water as the feed water to the reactor, except for the use of the sodium salt of alpha,alpha'-azobis(alpha, gamma, gamma-trimethyl-gamma-carboxy-butyronitrile) as the catalyst. A reduction in the amount of catalyst necessary to produce a polyvinyl fluoride product identical in quantity and quality to that produced without using recycle water was observed.

*Example 6*

Example 1 was repeated, i.e. using 50% recycle water and 50% process water as the feed water to the reactor, except for the use of the dihydrochloride of 2,2'-diguanyl-2,2'-azobutane as the catalyst. A reduction in the amount of catalyst necessary to produce a polyvinyl fluoride product identical in quantity and quality to that produced without using recycle water was observed.

*Examples 7 and 8*

Control A for these examples was similar to control A for Examples 1 and 2. Specifically, process water was filtered, deionized and deoxygenated. Its specific resistance was 1,000,000 ohm-cm. A water-soluble catalyst, the dihydrochloride of 2,2'-diguanyl-2,2'-azo-propane, was added to the water to provide 65 parts of the catalyst per million parts of water. The water containing the catalyst was fed to the reactor at a rate of 600 pounds per hour. Simultaneously, vinyl fluoride was fed to the reactor at a rate of 65 pounds per hour. The reactor was maintained at a temperature of 97° C. and a pressure of 8,000 p.s.i.

The contents of the reactor were agitated and a product slurry was removed continuously. The rate of slurry removed provided 18 pounds of polyvinyl fluoride/hour/cu. ft. of reactor volume. The polymer was filtered from the slurry and washed. Its Melt-Flow Number was 6.8.

In Example 7, recycle water from the first filtration was filtered, deionized and deoxygenated and used as the feed water. Its specific resistance was 1,000,000 ohm-cm. The vinyl fluoride feed rate was maintained at 65 pounds/hour and the feed water rate remained at 600 pounds/hour. The pressure and temperature of the reactor were the same as control A, 8,000 p.s.i. and 97° C., respectively. To obtain polyvinyl fluoride having a Melt-Flow Number of 6.8 at a rate of 18 pounds/hour/cu. ft. of reactor volume, it was found that a concentration of only 53 parts of the catalyst per million parts of water was necessary. This represented a saving of 18.5% in required catalyst.

In Example 8, Example 7 was repeated without deionizing the recycle water. Its specific resistance was, therefore, 250,000 ohm-cm. It was found that a 9.2% reduction in catalyst could be realized. That is, to produce polyvinyl fluoride (Melt-Flow Number of 6.8) at a rate of 18 pounds/hour/cu. ft. of reactor volume, a concentration of 59 parts of catalyst per million parts of feed water was necessary.

In control B, Example 8 was repeated except that no catalyst was added to the recycle water. As in control B of Example 1, no polymer was produced.

What is claimed is:

1. In the process for the polymerization of vinyl fluoride wherein vinyl fluoride, water and a water-soluble, free radical generating catalyst are introduced into a reactor, the pressure of the reactor is maintained at a pressure of 25–1,000 atmospheres and a temperature of 25°–250° C., the contents of the reactor are agitated, a slurry of a vinyl fluoride polymer and water is removed from the reactor, and the water is separated from the polymer, the improvement wherein at least a portion of the water separated from the polymer is introduced into the reactor with the vinyl fluoride and the water-soluble, free radical generating catalyst.

2. The process as in claim 1 wherein the water separated from the polymer constitutes at least 30% of the water used in the first step.

3. The process as in claim 1 wherein the water separated from the polymer constitutes about 50% of the water used in the first step.

4. The process as in claim 1 wherein all the water fed to the reactor is deoxygenated to contain less than 50 parts of oxygen per million parts of water and is deionized to a specific resistance of at least 50,000 ohm-centimeters.

5. The process as in claim 1 wherein all the water fed to the reactor is deoxygenated to contain less than 50 parts of oxygen per million parts of water and is deionized to a specific resistance of at least 200,000 ohm-centimeters.

6. The process as in claim 1 wherein the water-soluble catalyst is the dihydrochloride of 2,2'-diguanyl-2,2'-azopropane.

7. The process as in claim 1 wherein the water-soluble catalyst is potassium persulfate.

8. The process as in claim 1 wherein the water-soluble catalyst is beta,beta'-biscarboxypropionyl peroxide.

9. The process as in claim 1 wherein the water-soluble catalyst is the sodium salt of alpha,alpha'-azobis(alpha,gamma,gamma-trimethyl-gamma-carboxybutyronitrile).

10. The process as in claim 1 wherein the water-soluble catalyst is the dihydrochloride of 2,2'-diguanyl-2,2'-azobutane.

References Cited in the file of this patent

UNITED STATES PATENTS

| | | |
|---|---|---|
| 2,419,010 | Coffman et al. | Apr. 15, 1947 |
| 2,510,783 | Johnston et al. | June 6, 1950 |
| 2,810,702 | Bechtold et al. | Oct. 22, 1957 |